United States Patent [19]
Arikawa

[11] Patent Number: 4,753,493
[45] Date of Patent: Jun. 28, 1988

[54] ANTI-SKID CONTROL APPARATUS FOR A VEHICLE BRAKING SYSTEM

[75] Inventor: Tetsuro Arikawa, Kanagawa, Japan
[73] Assignee: Nippon A B S, Ltd., Tokyo, Japan
[21] Appl. No.: 916,406
[22] Filed: Oct. 7, 1986
[51] Int. Cl.$^4$ .............................................. B60T 8/62
[52] U.S. Cl. ..................................... 303/110; 303/111
[58] Field of Search .................... 303/93, 96, 105, 106, 303/109, 110, 111, 119

[56] References Cited
U.S. PATENT DOCUMENTS

| | | |
|---|---|---|
| 3,674,317 | 7/1972 | Mangold . |
| 3,907,377 | 9/1975 | Mayer . |
| 4,451,096 | 5/1984 | Gygax ................................ 303/109 |
| 4,547,022 | 10/1985 | Brearley et al. ................. 303/111 X |
| 4,637,664 | 1/1987 | Arikawa ............................ 303/111 |

*Primary Examiner*—Duane A. Reger
*Attorney, Agent, or Firm*—James P. Ryther

[57] ABSTRACT

An anti-skid control apparatus including front and rear wheels diagonally connected with each other; fluid pressure control valve devices arranged between a tandem master cylinder and the wheels; a control unit; and a valve apparatus for generating a fluid pressure in accordance with the lower one of the pressures of the front wheels. The control unit logically combines the judging results of the skid conditions of the front wheels with judging results of the skid conditions of the rear wheels located at the same side of the road to generate the instructions for controlling the fluid pressure control valve devices. A decrease instruction for decreasing the brake fluid pressure is formed by the logical sum of first skid conditions as the judging results of the front and rear wheels. An increase instruction for increasing the brake fluid pressure, after the decrease instruction disappears, is formed on the basis of the one of the front and rear wheels which are most likely to lock.

16 Claims, 7 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent the locking of the wheels.

2. Description of the Prior Art

Such an anti-skid control apparatus for a vehicle braking system is known and includes: a fluid pressure control valve device arranged between a master cylinder and a wheel cylinder of a brake for the wheel where the fluid pressure control valve device receives control signals from a control unit measuring the skid condition of the wheel to control the brake fluid pressure to the wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connects the master cylinder with the fluid pressure control valve device; and a fluid pump for returning the brake fluid from said hydraulic reservoir into said pressure fluid supply conduit.

When the fluid pressure control valve device is provided for each of the four wheels, and the respective fluid pressures are independently controlled, there is no problem with control operation. Also, when the fluid pressure control valve device is provided for each of front wheels, and for both of rear wheels in common, there is no problem on control operation. In the latter case, the one common fluid pressure control valve device is controlled on the basis of the lower one of the speeds of the rear wheels.

However, in the above cases, three or four fluid pressure control valve devices are used. Accordingly, the whole anti-skid control apparatus is large-sized, and very heavy. Since the fluid pressure control valve device is expensive, a high cost system results.

For example, the situation is considered where the brake fluid pressures of the front wheels are controlled by the two fluid pressure control valve devices respectively in the diagonal or X-type conduit system, and the brake fluid pressures of the rear wheels are controlled in common with the front wheels. When the vehicle runs on the road, the right and left sides of which are considerably different in frictional coefficient from each other, there is the probability that the one rear wheel being diagonal to the one front wheel on the higher frictional coefficient side will lock. In that case, the steering of the vehicle becomes unstable, and that is very dangerous.

Further, the situation is considered where proportioning valves are provided for the rear wheels, respectively. However, the brake fluid pressures of the rear wheels increases in proportion to the input fluid pressures to the proportioning valves. The problem of locking cannot be avoided.

Accordingly, in order to provide an anti-skid control apparatus for a vehicle braking system which can be small-sized and lightweight, and can avoid the problem of locking of rear wheels, this applicant previously proposed an anti-skid control apparatus for a vehicle braking system which includes; a fluid pressure control valve device arranged between a master cylinder and a wheel cylinder of a brake for the wheel where the fluid pressure control valve device receives control signals from a control unit, measuring the skid condition of the wheel, to control the brake fluid pressure to the wheel cylinder; a hydraulic reservoir which, when the brake fluid pressure to the wheel cylinder is decreased with control of said fluid pressure control valve device, reserves the brake fluid discharged through the fluid pressure control valve device from the wheel cylinder; a pressure fluid supply conduit connecting the master cylinder with the fluid pressure control valve device; and a fluid pump for returning the brake fluid from the hydraulic reservoir into the pressure fluid supply conduit. The fluid pressure control valve device being provided for a pair of front wheels, respectively, a valve apparatus receiving fluid pressures of wheel cylinders of the front wheels being arranged between the pair of front wheels and a pair of rear wheels such that when any one of the fluid pressure control valve devices starts to control, at least the fluid pressure of the one of the rear wheels, being at the same side as the one of the front wheels, the fluid pressure of the wheel cylinder of which is lower, is controlled in accordance with the lower one of the fluid pressures of the wheel cylinders of the front wheels by the valve apparatus.

In the above-described anti-skid control apparatus, the control signals for the control unit are formed by judging the skid conditions of the respective front wheels. On the assumption that the front and rear wheels are provided with tires of the same kind, the braking forces are so distributed to the wheels that the front wheels tend to lock sooner than the rear wheels when the vehicle is rapidly braked on the road which is uniform in frictional coefficient.

However, when the above assumption is not fulfilled, for example, when only the front wheels are provided with spike tires or chains for running on a snow or ice road, and the rear wheels are provided with the normal tires, the rear wheels tend to lock sooner than the front wheels. In the above anti-skid control apparatus, the brake fluid pressure is not controlled with the locking of the rear wheel. When the brake fluid pressure of the front wheel is controlled over the limit locking pressure of the rear wheel, the locking of the rear wheel is not released, and so the steering stability cannot be maintained.

Even in the case that the front and rear wheels are provided with the tires of the same kind, the rear wheel may tend to lock sooner than the front wheel when the frictional coefficient of the brake lining becomes excessively low due to thermal fade phenomenon in a front wheel brake apparatus and the limit lock pressure of the front wheel becomes excessively high, and particularly when the vehicle is rapidly braked on a higher frictional coefficient road. When a proportioning valve is used, the fluid pressure of the rear wheel is lower than that of the front wheel. However, it increases in proportion to the fluid pressure of the front wheel, and reaches the limit lock pressure. The above described locking problem occurs.

FIG. 1 shows the above described problem. Specifically, FIG. 1A shows the changes of the wheel speeds during the time when the vehicle is braked. FIG. 1B shows the control signals of the control unit. And FIG. 1C shows the changes of the brake fluid pressures of the wheels.

When the front and rear wheels are provided with the tires of the same kind, and they run on the road being uniform in frictional coefficient, the brake fluid pressures P and P' of the front and rear wheels change with time, as shown by the solid lines in FIG. 1C, when the brake pedal is trodden at time t0. The control unit generates a brake maintaining instruction at time t1. The fluid pressure control valve device is constituted by an inlet valve and an outlet valve. The control signals consist of signals EV and AV for the inlet and outlet valves respectively.

Although AV is still "0", EV becomes "1" at time t1. Thus, the brake fluid pressure P of the front wheel is maintained constant. The control unit generates a brake relieving instruction at time t2. Thus, EV is still "1", and AV becomes "1" from "0". As shown in FIG. 1C, the brake fluid pressure P of the front wheel decreases as shown in FIG. 1C. AV becomes "0" at time t3, while EV is still "1". Thus, the brake fluid pressure is maintained constant.

EV becomes "0" at time t4. The brake fluid pressure rises again. EV becomes again "1" at time t5. The brake fluid pressure is maintained constant. Hereafter, the brake pressure P in a stepwise fashion increases described as above. AV becomes "1" at time t6, while EV is "1". Accordingly, the brake fluid pressure P decreases.

In the above-described manner, the brake fluid pressure P of the front wheel changes with time. The brake fluid pressure P' of the rear wheel is reduced by the proportioning valve, and changes with time in accordance with the brake pressure P of the front wheel. The proportioning valve causes the hysteresys phenomenon by which the brake fluid pressure P' of the rear wheel changes a little later than that P of the front wheel. However, such a time lag is neglected in FIG. 1C.

Generally, a larger amount of brake fluid is required for a constant increases of brake fluid pressure in the lower pressure range under the influence of rigidity of the wheel cylinder in the rear wheel brake apparatus. Accordingly, the change range of the brake fluid pressure P' of the rear wheel is less than that of the front wheel, as shown in FIG. 1C.

The wheel speeds V, V' of the front and rear wheels change with time, as shown by the solid lines in FIG. 1A, in accordance with the above described changes of the brake fluid pressures. The preferable anti-skid control is effected. The wheel speeds are decreased without locking of the wheels.

However, when only the front wheels are provided with chains, or when the thermal fade phenomenon occurs in the front brake apparatus, the limit lock pressure of the front wheel is increased. In such a case, the brake fluid pressure P of the front wheel changes with time, as shown by dash-lines in FIG. 1A. It changes above the level of the brake fluid pressure shown by the solid line. On the other hand, the brake fluid pressure P' of the rear wheel changes beyond the rear limit lock pressure R, as shown by the dash line. Hereafter, even when the brake fluid pressure P of the front wheel is decreased, the rear wheel cannot be relieved from locking, partly because the range of the change of the brake fluid pressure P' is less. The front wheel is prevented from locking, as shown by the dash line in FIG. 1A. However, the rear wheel is locked. The anti-skid control is not preferably effected. The steering stability is lost. That is very dangerous.

SUMMARY OF THE INVENTION

Accordingly, it is an object of this invention to provide an anti-skid control apparatus for a vehicle braking system which can be small-sized and lightweight, and can avoid the problem of locking of rear wheels in all cases.

In accordance with an aspect of this invention, an anti-skid control apparatus for a vehicle braking system is provided including: (A) a pair of front wheels, and a pair of rear wheels in which wheel cylinders are diagonally connected in conduits; (B) a first fluid pressure control valve device for controlling the brake fluid pressure of the wheel cylinder of one of the front wheels, arranged between a first fluid pressure generating chamber of a tandem master cylinder and the wheel cylinder of the one front wheel; (C) a second fluid pressure control valve device for controlling the brake fluid pressure of the wheel cylinder of another of the front wheels, arranged between a second fluid pressure generating chamber of the tandem master cylinder and the wheel cylinder of the other front wheel; (D) a control unit for measuring or judging the skid conditions of the front and rear wheels and for generating instructions for controlling the first and second fluid pressure control valve devices; and (E) a valve apparatus for generating a fluid pressure in accordance with the lower one of the brake fluid pressures of said front wheels controlled with said first and second fluid pressure control valves devices, being arranged between said wheel cylinders of the front wheels and those of the rear wheels; the control unit combines logically the measuring or judging result of the skid condition of the one front wheel with that of the one rear wheel being at the same road side as the one front wheel for generating the instruction for controlling the first fluid pressure control valve device, and combine logically the measuring or judging result of the skid condition of the other front wheel with that of the other rear wheel being at the same road side as the other front wheel for generating the instruction for controlling the second fluid pressure control valve device; a decrease instruction for decreasing the brake fluid pressure is formed by the logical sum of the first skid conditions as the judging results of the front and rear wheels for decreasing the brake fluid pressures, and an increase instruction for increasing the brake fluid pressure, after the decrease instruction disappears, is formed by the one of the second skid conditions as the judging results of the front and rear wheels for increasing the brake fluid pressures. The one second skid condition being from the one of the rear and front wheels which generates the first skid condition earlier than the other of the rear and front wheels, or being from the one of the rear and front wheels the first skid condition of which disappears later than that of the other of the rear and front wheels.

In accordance with another aspect of this invention, an anti-skid control apparatus for a vehicle braking system is provided including: (A) a pair of front wheels, and a pair of rear wheels in which wheel cylinders are diagonally connected in conduits; (B) a first fluid pressure control valve device for controlling the brake fluid pressure of the wheel cylinder of one of the front wheels, arranged between a first fluid pressure generating chamber of a tandem master cylinder and the wheel cylinder of the one front wheel; (C) a second fluid pressure control valve devie for controlling the brake fluid pressure of the wheel cylinder of another of the front wheels, arranged between a second fluid pressure generating chamber of the tandem master cylinder and the wheel cylinder of the other front wheel; (D) a control unit for measuring or judging the skid conditions of the front and rear wheels and for generating instructions for controlling the first and second fluid pressure control valve devices; and (E) a valve apparatus for generating a fluid pressure in accordance with the lower one of the brake fluid pressures of the front wheels controlled with the first and second fluid pressure control valve devices, being arranged between the wheel cylinders of the front wheels and those of the rear wheels; the control unit combines logically the measuring or judging result of the skid condition of the one front wheel with that of the one rear wheel being at the same road side as the one front wheel for generating the instruction for controlling the first fluid pressure control valve device, and combines logically the measuring or judging result of the skid condition of the other front wheel with that of the other rear wheel being at the same road side as the other front wheel for generating the instruction for controlling the second fluid pressure control valve device; a decrease instruction for decreasing the brake fluid pressure is formed by the logical sum of the first skid conditions as the judging results of the front and rear wheels for decreasing the brake fluid pressures, and an increase instruction for increasing the brake fluid pressure, after the decrease instruction disappears, is formed by the one of the second skid conditions as the judging results of the front and rear wheels for increasing the brake fluid pressures. The one second skid condition being from the one of the rear and front wheels the acceleration of which is, after the decrease instruction, lower than that of the other of the rear and front wheels.

In accordance with a further aspect of this invention, an anti-skid control apparatus for a vehicle braking system is provided including: (A) a pair of front wheels, and a pair of rear wheels in which wheel cylinders are diagonally connected in conduits; (B) a first fluid pressure control valve device for controlling the brake fluid pressure of the wheel cylinder of one of the front wheels, arranged between a first fluid pressure generating chamber of a tandem master cylinder and the wheel cylinder of the one front wheel; (C) a second fluid pressure control valve device for controlling the brake fluid pressure of the wheel cylinder of another of the front wheels, arranged between a second fluid pressure generating chamber of the tandem master cylinder and the wheel cylinder of the other front wheel; (D) a control unit for measuring or judging the skid conditions of said front and rear wheels and for generating instructions for controlling the first and second fluid pressure control valve devices; and (E) a valve apparatus for generating a fluid pressure in accordance with the lower one of the brake fluid pressures of the front wheels controlled with the first and second fluid pressure control valve devices, being arranged between the wheel cylinders of the front wheels and those of the rear wheels, the control unit combines logically the measuring or judging result of the skid condition of the one front wheel with that of the one rear wheel being at the same road side as the one front wheel for generating the instruction for controlling the first fluid pressure control valve device, and combines logically the measuring or judging result of the skid condition of the other front wheel with that of the other rear wheel being at the same road side as the other front wheel for generating the instruction for controlling the second fluid pressure control valve device; a decrease instruction for decreasing the brake fluid pressure is formed by the logical sum of the first skid conditions as the judging results of the front and rear wheels for decreasing the brake fluid pressures, a brake-holding instruction for maintaining the brake fluid pressure constant, before the decrease instruction appears, is formed by the logical sum of the second skid conditions as the judging results of the front and rear wheels for maintaining the brake fluid pressures constant, and an increase instruction for increasing the brake fluid pressure, after the decrease instruction disappears, is formed by the one of the third skid conditions as the judging results of the front and rear wheels for increasing the brake fluid pressures, the one third skid condition being from the one of the rear and front wheels which generates the second skid condition earlier than the other of the rear and front wheels.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
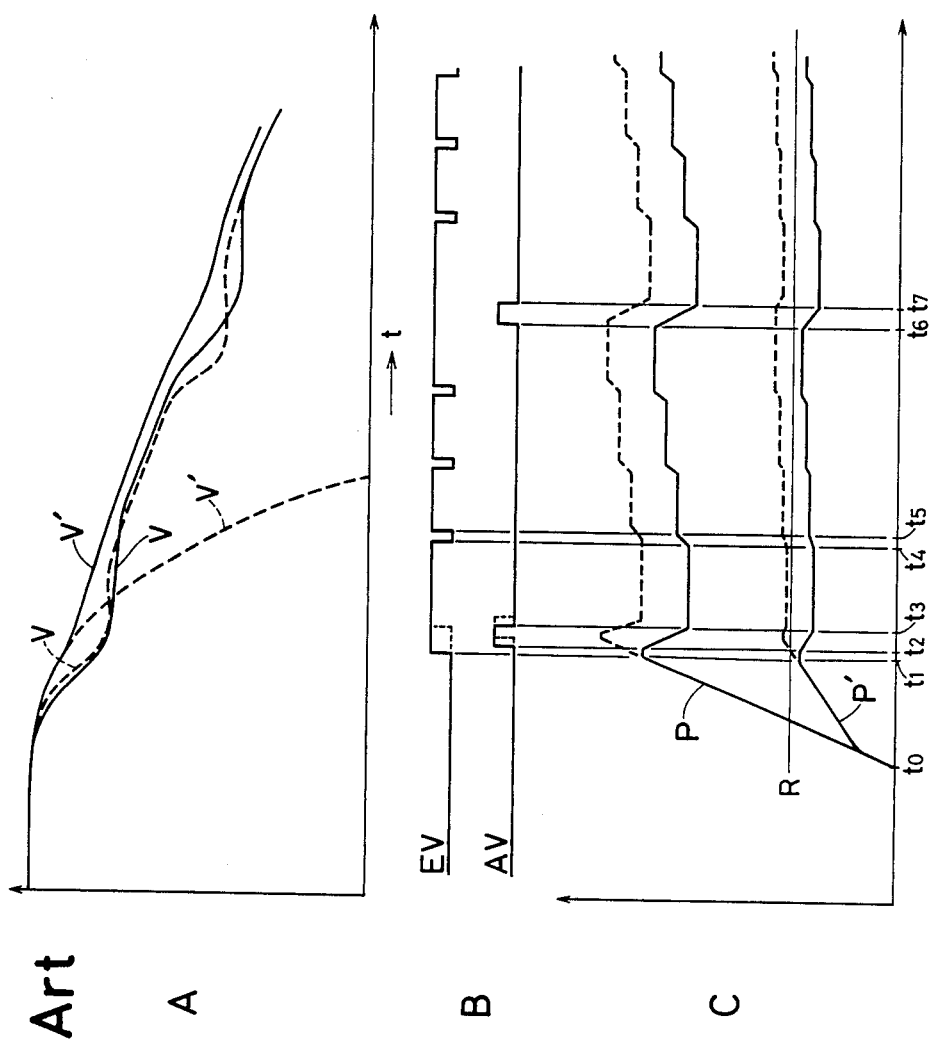
FIGS. 1A, 1B and 1C are graphs for explaining operations of a prior art anti-skid control apparatus.
Figure 2:
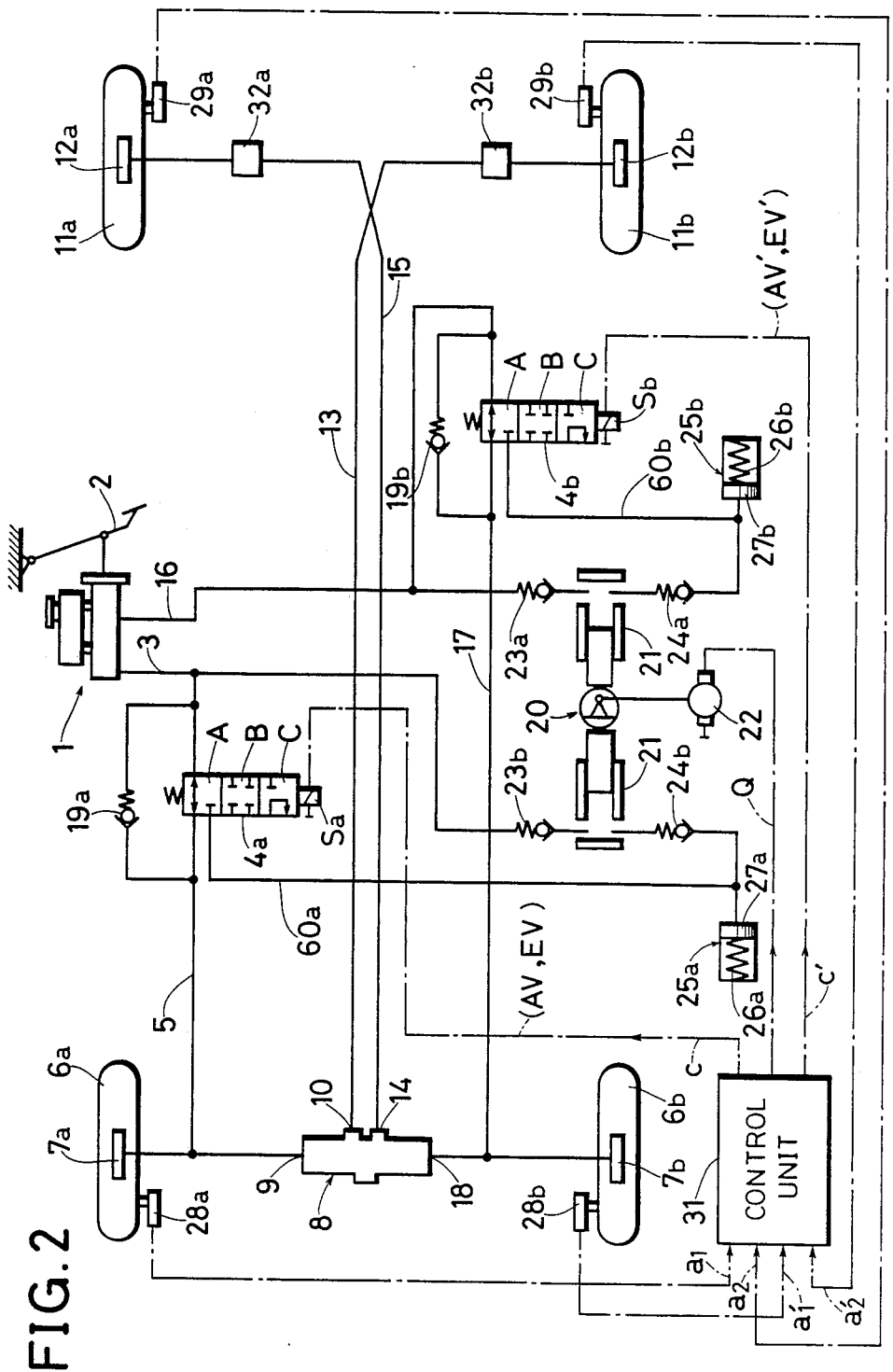
FIG. 2 is a schematic view of an anti-skid control apparatus according to an embodiment of this invention.

In FIG. 2, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic three position valve device 4a and a conduit 5. The conduit 5 is further connected to a first input port 9 of a valve apparatus 8 to be hereinafter described in detail. The first input port 9 normally communicates with a first output port 10 in the valve apparatus 8. The first output port 10 is connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro-magnetic three position valve device 4b and a conduit 17. The conduit 17 is further connected to a second input port 18 of the valve apparatus 8. The second input port 18 normally communicates with a second output port 14 in the valve apparatus 8. The second output port 14 is connected to a wheel cylinder 12a of a right rear wheel 11a through a conduit 15 and a proportional valve 32a.

Discharge openings of the valves 4a and 4b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20, or the sides of the check valves 23a, 23b are connected to the conduits 3 and 16.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31.

Figure 3:
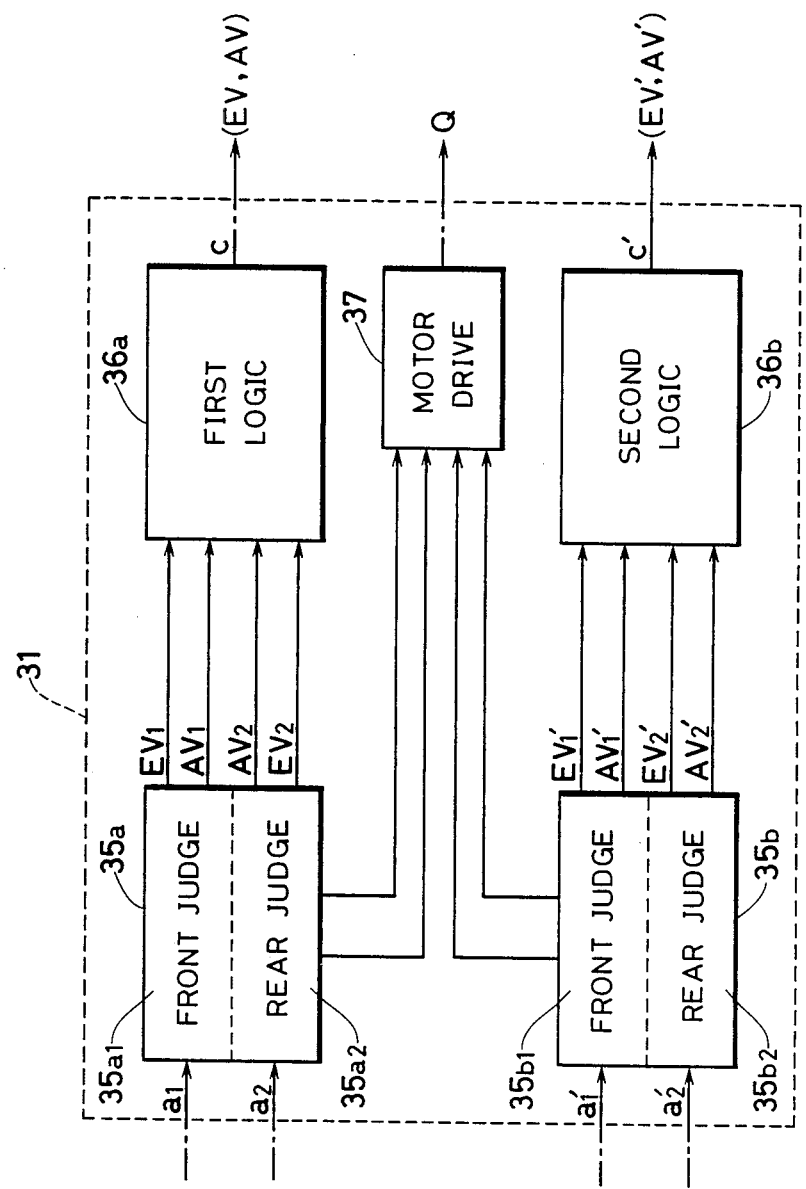
FIG. 3 is a block diagram of a control unit in FIG. 2.

As shown in FIG. 3, the control unit 31 consists of first and second judge circuits 35a and 35b, first and second logic circuits 36a and 36b and a motor drive circuit 37. The circuit 35a, 35b, 36a and 36b will be hereinafter described in detail. Output terminals of the wheel speed sensors 28a and 29a are connected to input terminals a1 and a2 of the first judge circuit 35a while output terminals of the wheel speed sensors 28b and 29b are connected to input terminals a1' and a2'. In other words, the first judge circuit 35a receives the wheel speed signals of the right front wheel 6a and right rear wheel 11a, judges them and supplies the judge results to the first logic circuit 36a. As will be hereinafter described, the judge results are logically combined with each other in the logic circuits 36a and a control signal EV or AV is generated at an output terminal C of the control unit 31. The second judge circuit 35b receives the wheel speed signals of the left front wheel 6b and left rear wheel 11b, judges them and supplies the judge results to the second logic circuit 36b. As will be hereinafter described, the judge results are logically combined with each other in the logic circuits 36b and a control signal EV' or AV' is generated at an output terminal C' of the control unit 31. The control signal EV, AV, EV' and AV' are supplied to solenoid portions Sa and Sb of the valves 4a and 4b respectively. Dash lines represent electric lead wires.

Although schematically shown, the electromagnetic valves 4a and 4b have well-known constructions. When the level of the control signal is "0", the valves take first positions A for increasing the brake pressure to the brake for the wheel, respectively. In the first positions A, the master cylinder side and the wheel cylinder side are made to communicate with each other. When the level of the control signals is "1", the valves take third positions C for decreasing the brake pressure to the brake, respectively. In the third positions C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b. When the level of the control signal is "½", the valves 4a and 4b take second positions B. The communications between the master cylinder side and the wheel cylinder side and between the wheel cylinder side and the reservoir side are interrupted. Thus, the brake pressures to the brakes are maintained constant.

The control unit 31 further generates a drive signal Q for the motor 22, and it is maintained during the skid control operation.

Next, the details of the valve apparatus 8, to which the brake fluid pressures are applied from the wheel cylinders 7a and 7b of the front wheels 6a and 6b, will be described which reference to FIG. 4.

A stepped through hole 61a is axially formed in a casing 61 for the valve apparatus 8. A cover member 62 provided with a seal ring 35 is screwed to a right opening portion of the casing 61. Another cover member 36 provided with a seal ring 37 is screwed to a left opening portion of the casing 61. The above described first and second input ports 9 and 18 are formed in the cover members 62 and 66, respectively.

A piston 38 provided with seal rings 39 and 40 is slidably fitted to a central portion of the stepped hole 61a. Rod portion 41a and 41b of the piston 38 normally contact with valve balls 47a and 47b across output chambers 50a and 50b, respectively. The valve balls 47a and 47b are positioned in input chambers 49a and 49b, and are urged towards valve seats 46a and 46b by springs 48a and 48b. The one valve seat 46b is formed in the inner wall of the casing 61. The other valve seat 46a is formed in a valve forming member 45 which is press fit to a cylindrical member 44. The above output chamber 50a is inside of the cylindrical member 44, and it communicates through holes 44a made in the circumferential wall portion, with the first output port 10. The other output chamber 50b communicates directly with the second output port 14.

Spring receiving rings 42a and 42b are slidably fitted to the rod portions 41a and 41b of the piston 38 for receiving springs 43a and 43b. They are urged towards the center by the springs 43a and 43b. Normally, flange portions of the spring receiving rings 42a and 42b contact with stepped portions 58a and 58b of the casing 61. There are little gaps between the spring receiving rings 42a, 42b and a main portion 59 of the piston 38. Thus, the neutral position of the piston 38 is determined in the stepped hole 61a.

A switch 52 provided with a seal ring 53 is tightly fitted into a hole made in the central wall of the casing 61. An actuator of the switch 52 is engaged with a groove 51 made in the circumference of the piston 38, in the neutral position. An electric wire 54 from the switch 52 is connected through a contact 55 of a b-contact type relay, and a warning lamp 56 to a positive terminal of a battery 57. The warning lamp 56 is energized, when the contact 55 remains closed and the switch 55 is operated. The contact 55 of the b-contact type relay normally closes, and when the antiskid apparatus of FIG. 2 operates in order, it is opened. For example, when the fluid pressure pump 20 operates, it is opened.

In the shown neutral position of the piston 38, the valve balls 47a and 47b are separated from the valve seats 46a and 46b by the rod portions 41a and 41b. The input chambers 49a and 49b are made to communicate with the output chambers 50a and 50b.

In FIG. 2, check valves 19a and 19b are connected in parallel with the electro magnetic valves 4a and 4b. They permit brake fluid to flow only in the direction from the wheel cylinder side towards the master cylinder side. Both sides of the valves 4a and 4b communicate with each other through throttling holes in the A positions.

Accordingly, pressurized fluid is rapidly returned through the check valves 19a and 19b to the master cylinder 1 for the wheel cylinders 7a, 7b, 12a and 12b, when the brake is released.

The first and second judge circuits 35a and 35b have the same circuit constructions. Accordingly, only the first judge circuit 35a will be described in detail with reference to FIG. 5.

The first and second judge circuits 35a and 35b consist of front wheel judge parts 35a1, 35b1 and rear wheel judge parts 35a2, 35b2, respectively. The signals from the wheel speed sensors 28a and 29a are supplied to wheel speed signal generators 72a and 72b. Digital or analogue outputs proportional to the wheel speeds are obtained from the wheel speed signal generators 72a and 72b and differenciators 73a and 73b.

The approximate vehicle speed signal generators 76a and 76b receive the outputs of the speed signal generator 72a and 72b. The outputs of the approximate vehicle speed signal generators 76a and 76b are equal to the outputs of the wheel speed signal generators 72a and 72b, until the deceleration of the wheel reaches a predetermined value. After it becomes higher than the predetermined value, the outputs of the approximate vehicle speed signal generators 76a and 76b decrease at a predetermined gradient with time. The initial outputs are equal to the outputs at the time when the deceleration of the wheel has reached the predetermined value. The outputs of the approximate vehicle speed signal generators 76a and 76b are supplied to a selecting circuit 71. The higher of the outputs of the approximate vehicle speed generators 76a and 76b is selected by the selecting circuit 71, and it is supplied to the slip signal generators 77a and 77b to be compared with the outputs of the wheel speed signal generators 72a and 72b. A predetermined reference ratio or amount is set in the respective slip signal generator 77a and 77b. The reference ratio or amount is for example, 0.15 (15%).

Generally, a slip ratio S of the wheel is given by the following formula:

$$S = 1 - \frac{\text{wheel speed } (V, V')}{\text{vehicle speed } (E)}$$

When $$\left(1 - \frac{V1, V'}{E}\right)$$

is larger than the reference ratio, a slip signal S is generated from the slip signal generator 77a, namely the output of the slip signal generator 77a becomes a higher level "1" of the two levels "1" and "0".

The differentiator 73a and 73b receive the outputs of the wheel speed signal generators 72a and 72b, and differentiate them with respect to time. The outputs of the differentiators 73a and 73b are supplied to deceleration signal generators 75a and 75b, and to acceleration signal generators 74a and 74b. A predetermined threshold deceleration (for example, 1.5g) is set in the deceleration signal generators 75a and 75b, and it is compared with the outputs of the differentiators 73a and 73b. A predetermined threshold acceleration (for example, 0.5g) is set in the acceleration signal generators 74a and 74b, and it is compared with the outputs of the differentiators 73a and 73b. When the deceleration of the wheel becomes larger than the predetermined threshold deceleration ($-1.5g$), a deceleration signal $-b$ is generated from the deceleration signal generator 75a or 75b. When the acceleration of the wheel becomes larger than the predetermined threshold acceleration (0.5g), an acceleration signal $+b$ is generated from the acceleration signal generator 74a, or 74b.

Output terminals of the acceleration signal generators 74a and 74b are connected to negation input terminals (indicated by circle 0) of AND gates 92a, 92b, negation input terminals of AND gates 90a, 90b, OFF delay timers 88a, 88b and first input terminals of OR gates 94a, 94b. Output terminals of the OFF delay timers 88a, 88b are connected to input terminals of the AND gates 90a, 90b. Output terminals of the AND gates 90a, 90b are connected to input terminals of pulse generators 78a, 78b and input terminals of AND gates 90a, 93b. Output terminals of the pulse generators 78a, 78b are connected to negation input terminals of the AND gates 93a, 93b. Stepwise brake-increasing signal generators 81a, 81b are constituted by the acceleration signal generators 784a, 74b, the OFF-delay timers 88a, 88b, the pulse generators 7a, 78b, the OR gates 94a, 94b, and the AND gates 90a, 90b, 93a, 93b, and they generate pulse signals to slowly increase the brake pressure for delay time of the OFF delay timers 88a, 88b. Output terminals of the AND gates 93a, 93b are connected to second input terminals of the OR gates 94a, 94b.

Output terminals of the deceleration signal generators 75a, 75b are connected to third input terminals of the OR gates 94a, 94b through OFF-delay timers 96a and 96b and to input terminals of the approximate vehicle speed signal generators 77a, 76b. Output terminals of the slip signal generators 77a, 77b are connected to other input terminals the AND gates 92a, 92b.

Signals EV1, EV2 and AV1, AV2 at output terminals of the OR gates 94a, 94b and AND gates 92a, 92b are judge results, and they are supplied to the following stage, or the first logic circuit 36a. The levels of the signals EV1, EV2 are "½", while those of the signals AV1, AV2 are "1".

The output terminals of the AND gates 92a, 92b are further connected to OFF delay 95a, 95b. Signals AV1Z and AV2Z at the output terminals of the OFF-delay timers 95a, 95b are supplied to the motor drive circuit 37. The delay time is so sufficiently long to maintain the output of the OFF-delay timers 95a, 95b at the higher "1" of the two levels "1" and "0" during the anti-skid control operation, after the outputs of he AND gate 92a, 92b become the lower level "0" of the two levels "1" and "0".

Signals EV1', EV2', AV1', AV2' corresponding to the above signals EV1, EV2, AV1, AV2 respectively, are similarly formed in the second judge circuit 35b.

The first and second logic circuits 36a and 36b have the same circuit construction. Accordingly only the first logic circuit 36a will be described with reference to FIG. 6.

A right skid signal selecting circuit 100 includes a flip-flop, AND gates, OR gates etc., and receives the output signals EV1, EV2, AV1 and AV2 of the former judge circuit 35a. It detects which of the signals AV1 and AV2 disappears later, and selects either the signal EV1 or the signal EV2 on the basis of the above detection. It generates the logical sum of the signals EV1 and EV2, before, the signal AV1 or AV2 which shall disappear later, is generated, or while the same signal AV1 or AV2 is appearing.

The output terminal of the right skid signal selecting circuit 100 is connected to one input terminal of an AND gate 101. The output signals AV1 and AV2 are further supplied to input terminals of an OR gate 102. An output terminal of the OR gate 102 is connected through a NOT gate 103 to another input terminal of the AND gate 101.

Outputs of the AND gate 101 and OR gate 102 are amplified by amplifiers 104 and 105, respectively. The output signals EV and AV of the levels "½" and "1" respectively are obtained from the amplifiers 104 and 105, and they are supplied to the solenoid portion Sa of the electro-magnetic valve 4a.

The second logic circuit 36b receives the output signals EV1', AV1' of the former second judge circuit 35b. Similarly output signals EV', AV' of the levels "½" and "1" are formed, and they are supplied to the solenoid portions Sb of the electro-magnetic valve 4b.

Figure 7:
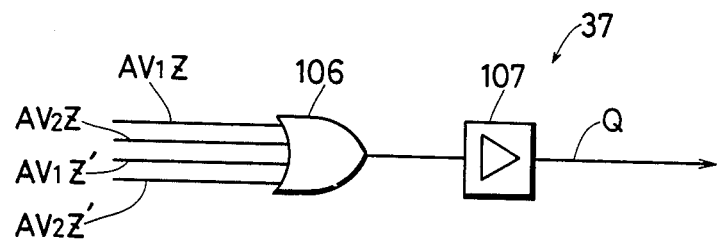
FIG. 7 is a circuit diagram of a motor drive circuit in FIG. 3.

FIG. 7 shows the motor drive circuit 37 which consists of an OR gate 106 and an amplifier 107. The output signals AV1Z and AV2Z of the first judge circuit 35a are supplied to first and second input terminals of the OR gate 106. The signals AV1Z and AV2Z are formed by the skid conditions of the right front wheel 7a and right rear wheel 11a, in the first judge circuit 35b. Similarly signals AV1Z' and AV2Z' are formed by the skid conditions of the left front wheel 6b and left rear wheel 11b. They are supplied to fourth and third input terminals of the OR gate 106. An output of the OR gate 106 is amplified by the amplifier 107. The output signal Q of the amplifier 107 is supplied to the motor 22 shown in FIG. 2.

Next, there will be described operations of the above described anti-skid apparatus.

It is assumed that the wheels 6a, 6b, 11a and 11b are provided with the tires of a same kind and run on the road which is uniform in frictional coefficient.

The vehicle driver treads the brake pedal 2. At the beginning of the braking, the control signals EV, AV, EV', AV' are "0" from the control unit 31. Accordingly, the valves 4a and 4b are in the A-position. Pressurized fluid is supplied from the master cylinder 1 to the wheel cylinders 7a and 7b of the front wheels 6a and 6b through the conduits 3, 127, the valves 4a, 4b and the conduits 5, 17. Further it is supplied to the wheel cylinders 12a, and 12b of the rear wheels 11a and 11b through the first and second input ports 9, 18, the input chambers 49a, 49b, the output chambers 50a, 50b, the first and second output ports 10, 14 in the valve apparatus 8, and the conduits 13 and 15. Thus, the wheels 76a, 6b, 11a and 11b are braked. The proportioning valves 32a and 32b effect the well-known operations. When the input pressure is lower than a predetermined value, it is transmitted to the output side without reduction. When the input pressure is higher than the predetermined value, it is reduced nearly at a constant rate, and transmitted to the output side.

When the deceleration of the wheels 6a, 6b, 11a and 11b becomes higher than the predetermined deceleration with the increase of the brake fluid pressure, the deceleration signal −b is generated from the deceleration signal generators 75a, 75b (designated representatively about the first judge circuit) in the judge circuits 35a, 35b. For facilitating the understanding, it is assumed that the decelerations or slips of the wheels 6a, 6b, 11a, 11b reach the predetermined deceleration or slip at the same time.

The signals EV2, EV2, EV1', EV2' become "1" with the deceleration signal −b. The output signals EV, EV' of the logic circuits 36a, 36b becomes ("1" the level of the voltage "½") with the signals EV12, EV2, EV1', EV2'. The solenoid portions Sa and Sb are energized. The valves 4a and 4b take the second position B. The conduits 3, 16 are interrupted from the conduits 5, 17. Further, the conduits 5, 17 are interrupted from the conduits 60a, 60b. Thus the brake fluid pressures of the wheel cylinders 6a, 6b, 12a, and 12b are maintained at constant.

When the deceleration of the wheels becomes lower than the predetermined deceleration, the deceleration signal −b disappears from the deceleration signal generators 75a, 75b. However, the outputs EV1, EV2, EV1', EV2' continues for the delay time of the OFF delay timers 96a, 96b. Then, the valves 4a, 4b are again changed into the position A. Thus, the brake fluid pressure again increases. When the slip of the wheels reaches the predetermined slip, the slip signal S is generated from the slip signal generators 77a, 77b. The acceleration signal generators 74a, 74b do not yet generate the acceleration signal +b. Accordingly, the output AV1, AV2, AV1', AV2' of the AND gates 92a, 92b becomes "1". The outputs AV, AV' of the logic circuits 6a, 6b become "1" (the voltage level "1"). The valves 4a and 4b are changed over into the positions C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a an 11b is discharged through the conduits 15, 13, the output ports 14, 10, the output chambers 50a, 50b, the input chambers 49a, 49b, the input ports 18, 9 in the valve apparatus 8, and the conduits 17, 5, 60a and 60b, into the hydraulic reservoirs 25a and 25b. Thus the brakes of the wheels 6a, 6b, 11a and 11 are relieved.

The fluid pressure pump 20 starts to drive with the signals AV, AV2, AV1', AV2'. The brake fluid is sucked from the reservoirs 25a and 25b and supplied towards the conduits 3 and 16, nearly at the same rate by the fluid pressure pump 20. Accordingly, the fluid pressures at both sides of the piston 38 are decreased nearly at the same rate. The piston 38 remains stopped at the neutral position, and the valve balls 47a and 47b remain separated from the valve seats 476a and 46b.

When the wheel speeds become higher, and the accelerations of the wheels reach the predetermined acceleration the acceleration signal +b is generated from the accelerator signal generators 74a, 74b. Thus, the outputs EV1, EV2, EV1', EV2' of the judge circuits 35a, 35b become "1". The outputs EV, EV' of the logic circuits 37a, 37b become "1". Accordingly, the brake fluid pressure of the wheels is maintained constant.

The pulse generators 78a, 78b start to drive with disappearance of the acceleration signal +b. The outputs EV1, EV, EV1', EV2' change as "0", "1", "0", "1", . . . for the delay time of the OFF-delay timers 88a, 88b. Accordingly, the outputs EV, EV' of the logic circuits 36a, 36b change similarly. The brake pressures of the wheel increase in a stepwise manner.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valve apparatus 8, the valves 4a, 4b the check valves 19a and 19b.

In the above description, the control signals EV1, EV2, EV1', EV2' or AV1, AV2, AV1', AV2' become "0" or "1" at the same time. However, when the frictional coefficients of the road are considerably different at the right and left sides, the control signals do not become "0" or "1" at the same time. For example, when the frictional coefficient of the right side of the road is relatively small, the control signal EV1, EV2 or AV1, AV2 first becomes "1". Next, such a case will be described.

For simplifying the description, it is assumed that the deceleration signals −b or slip signals of the right wheels 6a, 11a are generated the same time. In other words, the outputs EV1, EV2 or AV1, AV2 of the judge circuits 35a become "0" or "1" at the same time. The output EV or AV of the first logic circuit 36a becomes "0" or "1" with the output EV1, EV2 or AV1, AV2. The brake fluid pressure of the right front wheel 6a is maintained at constant or decreased by functions of the valve 4a. The left wheels 6b and 11b on the higher frictional road side (high μ side) do not yet tend to lock. Accordingly, the outputs EV', AV' are "0". The valve 4b is not energized. The brake fluid pressure of the front wheel 6b continues to rise.

Figure 4:
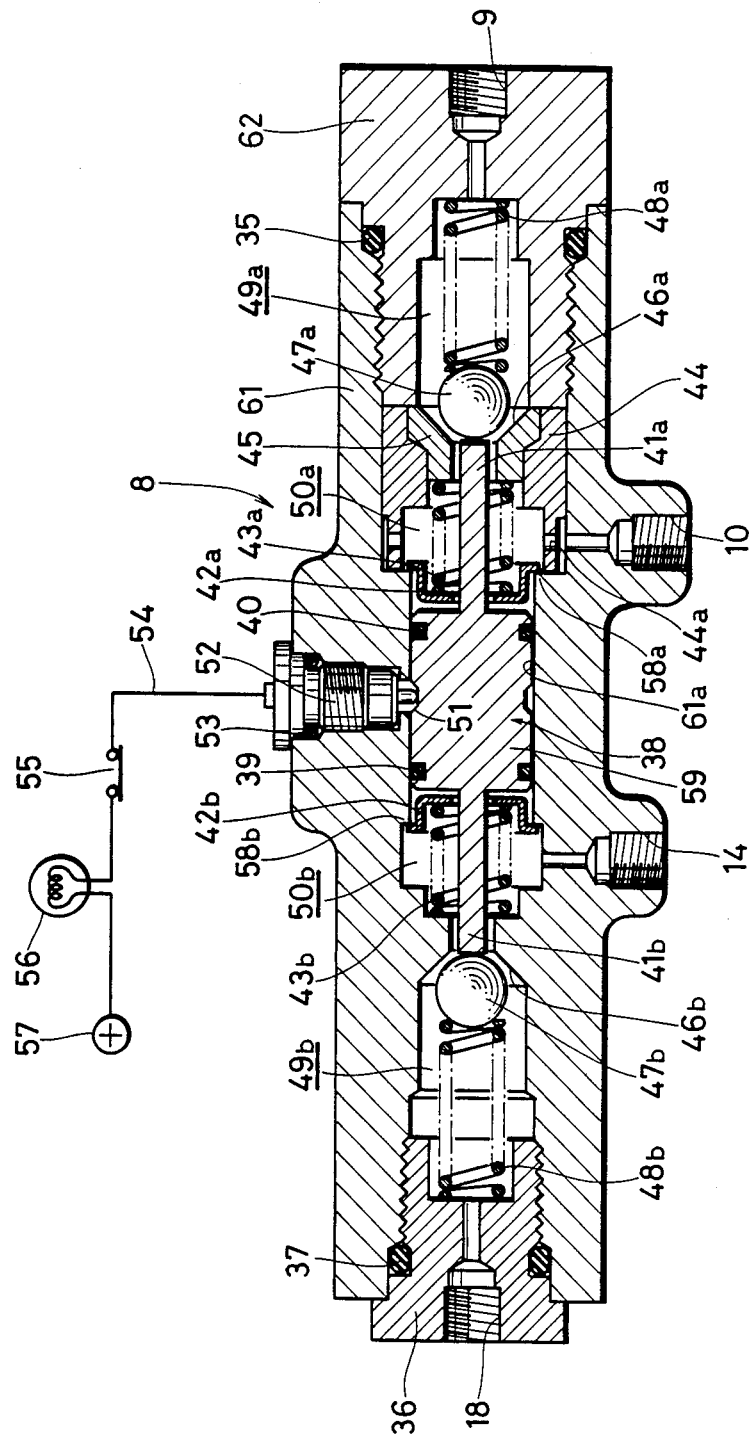
FIG. 4 is an enlarged cross-sectional view of a valve apparatus in FIG. 2.

In the valve apparatus 8 shown in FIG. 4, the fluid pressure is decreased in the input and output chambers 49a and 50a at the right side of the piston 38. On the other hand, the brake fluid continues to be supplied to the wheel cylinders 7b and 12a from the master cylinder 1. Accordingly, the rightward pushing force to the piston 38 becomes larger. The piston 38 is moved rightwards. Thus, the left valve ball 47b comes to seat the valve 46b by spring action of the spring 48b. On the other hand, the right valve ball 47a is further separated for the valve seat 46a by the rod portion 41a. The right input chamber 49a remains in communication with the right output chamber 50a, while the left input chamber 49b is interrupted from the left output chamber 50b. Thus, the fluid supply to the wheel cylinder 12a of the one rear wheel 11a is interrupted from the master cylinder 1.

When the piston 38 is further moved rightwards with the decrease of the fluid pressure of the right input and output chambers 49a and 50a, the volume of the left output chamber 50b interrupted from the left input chamber 49b is increased. In other words, the fluid pressure of the wheel cylinder 12a of the rear wheel 11a is lowered since the wheel cylinder 12a communicates with the left output chamber 50b through the output port 14 and the conduit 15.

When the control signals EV, AV again becomes "0" to increase the fluid pressure of the input and output chambers 49a and 50a, the piston 38 is moved leftwards to decrease the volume of the left output chamber 5b, while the left valve ball 47b seats in the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 7a is controlled in accordance with the brake fluid pressure of the wheel cylinders 7a of the front wheel 7a. Thus, the rear wheel 11a running on the lower frictional coefficient side of the road is prevented from locking, similarly to the front wheel 67a at the same side. If the brake fluid pressure of the wheel cylinder 12a of the rear wheel 11a is controlled in common with the brake fluid pressure of the wheel cylinder 7b of the wheel 6b running on the higher frictional coefficient side, the rear wheel 11a would be locked.

There has been above described the case that all of the wheels are provided with the tires of the same kind. Next, there will be described the case that only the front wheels 6a, 6b are provided with spike tires or chains. It is assumed that the vehicle runs on the split road, the frictional coefficients of which are considerably different at the right and left sides, and further it is assumed that the right front and wheels 6a, 11a run on the low μ side and the left front and rear wheels 6b, 11b run on the high μ side.

Figure 8:
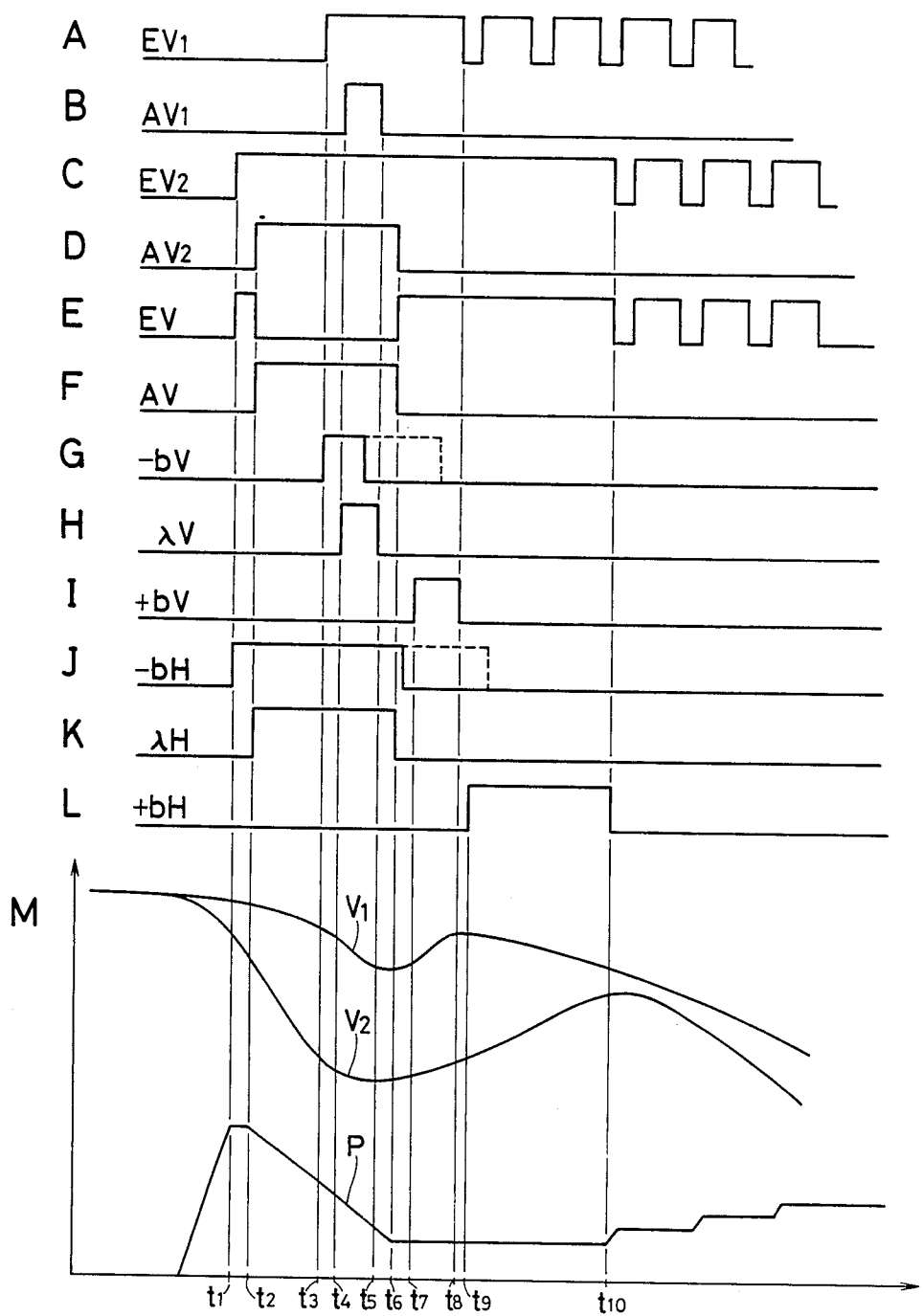
FIGS. 8A–8M are graphs for explaining operations of the embodiment of this invention.

When the brake pedal 2 is rapidly trodden, the brake fluid pressure P of the front wheel 6a increases as shown in FIG. 8M. The front wheel 6a and the rear wheel 11b of the same conduit system are braked with the brake fluid pressure P. In the other conduit system, the brake fluid pressure is similarly increased and the front wheel 6b and the rear wheel 11a are braked. However, since the rear wheel 11a runs on the low-μ side of the road, the wheel speed V2 of the rear wheel 11a is more rapidly lowered, as shown in FIG. 8M. The deceleration signal −bH of the rear wheel 11a becomes "1" at time t1, as shown in FIG. 8J. Thus, the signal EV2 of the first judge circuit 35a becomes "1" as shown in FIG. 8C. Accordingly, the output of the right skid control signal selecting circuit 100 becomes "1" in FIG. 6. It is supplied to one input terminal of the AND gate 101. On the other hand, the signals AV1, AV2 are yet "0". Accordingly, the input to the other input terminal of the AND gate 101 is "1". The output of the AND gate 101 becomes "1". The output signal EV of the logic circuit 36a becomes "1", as shown in FIG. 8E. Thus, the brake fluid sure P is maintained constant.

Figure 6:
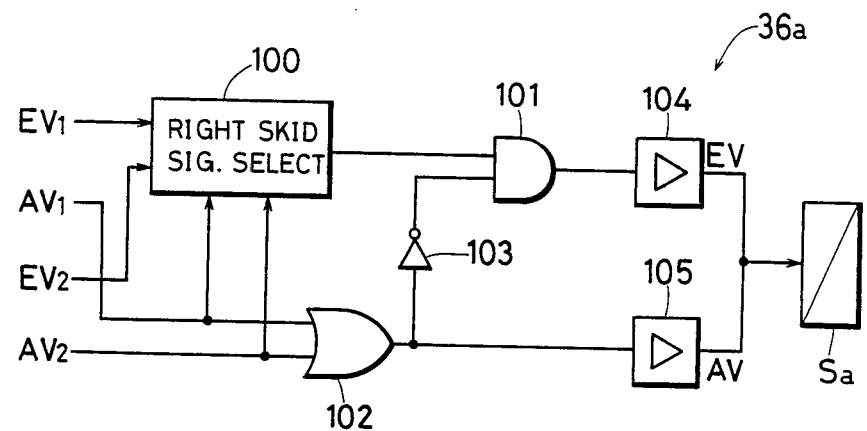
FIG. 6 is a circuit diagram of a first logic circuit in FIG. 3.

The slip of the right rear wheel 11a reaches the predetermined slip ratio a time t2. The slip signal λH becomes "1" as shown in FIG. 8K. Accordingly, the output AV2 of the first judge circuit 35a becomes "1", as shown in FIG. 8D. In FIG. 6, the output of the OR gate 102, and therefore the output AV becomes "1" as shown in FIG. 8F. The brake fluid pressure P is lowered. The deceleration signal −bH is still "1", and therefore the output EV2 is "1". However the input to the other input terminal of the AND gate 101 becomes "0". Accordingly, the output of the AND gate 101, therefore the output EV becomes "0" as shown in FIG. 8E.

The deceleration of the right front wheel 6a reaches the predetermined deceleration value at time t3. Thus, the deceleration signal −bV becomes "1" as shown in FIG. 8G. Accordingly, the output EV becomes "1". However, since the output AV2 is now "1", the output EV of the logic circuit 35a is not influenced.

The slip of the right front wheel 6a reaches the predetermined slip ratio at time t4. Thus, the slip signal λV becomes "1". Accordingly, the output AV1 of the first judge circuit 35a becomes "1" as shown in FIG. 8B. However the output of the OR gate 102 in FIG. 6 is not influenced.

The slip signal λV becomes "0" at time t5. However, the output AV2 is still "1". Accordingly, the output of the OR gate 102, therefore the output AV remain "1". The brake fluid pressure P continues to decrease.

The slip signal λH becomes "0" at time t6. Thus, the output AV2 becomes "0". Accordingly, the output AV of the logic circuit 35a becomes "0". On the other hand, the outputs EV1 and EV2 are still "1". Accordingly, the output of the logic circuit 35a becomes again "1". Thus, the brake fluid pressure P is maintained constant, as shown in FIG. 8M.

The liability of the front wheel 6a to accelerate is higher than that of the rear wheel 11a. The acceleration of the front wheel 6a reaches the predetermined valve at time t7. The acceleration signal +bv becomes "1" as shown in FIG. 8I. The deceleration signal −bV already disappears. However, the output of the OFF-delay timer 96a is lengthened as shown by the dotted line in FIG. 8G. Accordingly, the output EV1 continues to be "1".

Figure 5:
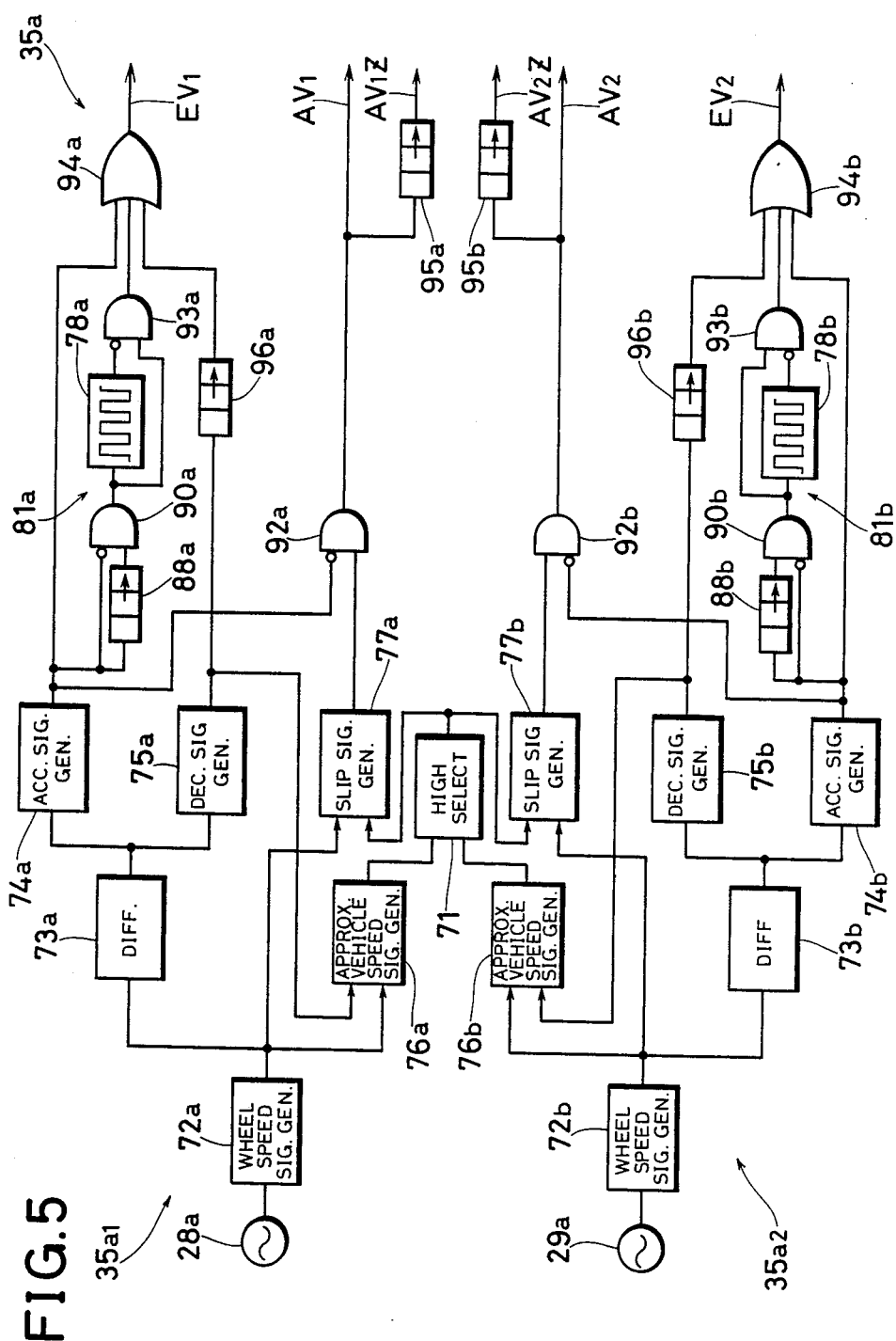
FIG. 5 is a circuit diagram of a first judge circuit in FIG. 3.

The acceleration signal +bV becomes "0" at time t8. In FIG. 5, the pulse generator 81a starts to operate. The output EV1 changes pulse-likely as "1", "0", "1", "0", ..., as shown in FIG. 8A. Thus, it is judged that the front wheel 6a is in the skid condition in which the brake fluid pressure should be increased in a stepwise fashion. However, the right skid signal selecting circuit 100 has detected that the output signal AV2 exhibiting the skid condition to relieve the brake disappears later than the output signal AV1 exhibiting the same skid condition. Accordingly, it selects the output signal EV2. The output of the right skid signal selecting circuit corresponds to the output signal EV2. Accordingly, the brake fluid pressure P is maintained constant.

The acceleration of the rear wheel 11a having the lower liability to accelerate reaches the predetermined value at time t9. Thus, the acceleration signal +bH becomes "1" as shown in FIG. 8L. However, the output signal EV2 continues to be "1", since it is lengthened by the delay time of the OFF-delay timer 96b after the deceleration signal −bH disappears.

The acceleration signal +bH becomes "0" at time t10. In FIG. 5, the pulse generator 81b starts to operate. The output signal EV2 changes pulse-likely as "1", "0", "1", "0", ..., as shown in FIG. 8C. Thus, it is judged that the rear wheel 11a is in the skid condition in which the brake fluid pressure should be increased in a stepwise manner. The right skid signal selecting circuit 100 selects the output signal EV2, since the output signal AV2 has disappeared later than the output signal AV1. Accordingly, the brake fluid pressure P is now increased in a stepwise manner, as shown in FIG. 8M. Thus, it is slowly increased.

In the above-described manner, the anti-skid control operation is effected. When the brake fluid pressure P of the front wheel 6a is decreased, the brake fluid pressures of both of the rear wheels 11a, 11b are decreased by function of the valve apparatus 8. Thus, both of the rear wheels 11a, 11b are prevented from locking.

The brake fluid pressure of the rear wheel 11a is reduced by the proportioning value 32a, but it changes similarly to the brake fluid pressure P of the front wheel 6a as shown in FIG. 8M.

The same operations as above described are effected in the case that the front wheels 6a, 6b are provided with spike tires or chains or are subject to thermal fade phenomenon, and that the vehicle runs on the road which is uniform in frictional coefficient.

Next, there will be described the case that one of the two conduit systems fails.

For example, when brake fluid leaks from the one conduit system including the conduit 3, the fluid pressures of the wheel cylinders 7a and 12b do not increase by treading the brake pedal 12. On the other hand, the fluid pressure of the other conduit system including the conduit 16 increases by treading the brake pedal 2. Accordingly, the piston 38 is moved rightwards in the valve apparatus 8. Since the anti-skid control is not effected, the contact 55 remains closed. The switch 52 is actuated with the movement of the piston 38. Electric current flows through the warning lamp 56 from the battery 57. The warning lamp 56 lights. Thus, the vehicle driver knows that the anti-skid apparatus fails. When the anti-skid apparatus does not fail, the contact 55 is opened with the beginning of the anti-skid control operation (for example, the beginning of the drive of the fluid pressure pump 20). Accordingly, the warning lamp 57 does not light with the movement of the piston 38.

While the preferred embodiment has been described, variations thereto will occur to those skilled in the art within the scope of the present inventive concepts which are delineated by the following claims.

For example, the judge circuit is not limited to that of FIG. 5, but a well-known judge circuit may be applied to this invention.

Further, in the above embodiment, the fluid pressure control valves 4a and 4b consist of single-three-position valves, respectively. However, they may consist of inlet and outlet valves, respectively.

Further in the above embodiment, the larger of the outputs of the approximate vehicle speed generators 76a, 76b is selected for forming slip signals. However, the approximate vehicle signal may be formed on the basis of the higher wheel speed signals for forming slip signals.

Further in the above embodiment, the approximate vehicle speed is formed on the basis of the wheels speeds of the front and rear wheels on the same side of the road. However, it may be formed on the basis of the wheel speeds of the front and rear wheels being in the diagonal positional relationship. Or it may be formed on the basis of the wheel speeds of all of the wheels.

Further in the above embodiment, the proportioning valves 32a and 32b are arranged between the valve apparatus 8 and the wheel cylinders 12a and 12b. However, they may be omitted.

Further in the above embodiment, the brake fluid pressure is increased in a stepwise manner directly after the acceleration signal +bH disappears. However, the start of the stepwise increase may be retarded. Thus, the brake fluid pressure p may be rapidly increased for a predetermined time directly after the acceleration signal +bH disappears, and then it may be increased in a stepwise manner.

Further in the above embodiment, the right skid signal selecting circuit 100 detects which of the outputs AV1 and AV2 disappears later, and it selects the output EV1 or EV2 of the corresponding wheel on the basis of the detection. However, it may detect which of the outputs AV1 and AV2 appears earlier, and it may select the output EV1 or EV2 of the corresponding wheel on the basis of the detection. In that case, the same effect as the above embodiment can be obtained.

Or the one of the outputs EV1 and EV2 which is generated earlier, may be selected by the right skid signal selecting circuit.

Or the brake fluid pressure may be again increased in accordance with the skid condition of the one of the rear and front wheels, both the brake holding signal (EV1 or EV2) and the brake relieving signal (AV1 or AV2) of which are generated earlier.

What is claimed is:

1. An anti-skid control apparatus for a vehicle braking sysetm, including:
   (A) a pair of front wheels and a pair of rear wheels each of said wheels having a wheel cylinder associated therewith where said wheel cylinders are diagonally connected by conduits;
   (B) a tandem master cylinder having first and second fluid pressure generating chambers;
   (C) a first fluid pressure control valve device for controlling the brake fluid pressuer of the wheel cylinder of one of said front wheels arranged between said first fluid pressure generating chamber of the tandem master cylinder and the wheel cylinder of the one front wheel;
   (D) a second fluid pressure control valve device for controlling the brake fluid pressure of the wheel cylinder of the other of said front wheels arranged between said second fluid pressure generating chamber of said tandem master cylinder and the wheel cylinder of said other front wheel;
   (E) a control unit for measuring or judging the skid conditions of said front and rear wheels and for generating instructions for controlling said first and second fluid pressure control valve devices; and
   (F) a valve means for generating a fluid pressure in accordance with the lower one of the brake fluid pressures of said front wheels controlled by said first and second fluid pressure control valve devices, said valve means being arranged between said wheel cylinders of the front wheels and the wheel cylinders of the rear wheels; said control unit combining logically the measuring or judging result of the skid condition of the one front wheel with that of the rear wheel being at the same side of the road as said one front wheel for generating the instruction for controlling said first fluid pressure control valve device, and combining logically the measuring or judging result of the skid condition of the other front wheel with that of the rear wheel being at the same side of the road as said other front wheel for generating the instruction for controlling said second fluid pressure control valve device; wherein a decrease instruction for decreasing the brake fluid pressure is formed by the logical sum of a first skid condition as the judging results of said front and rear wheels for decreasing the brake fluid pressures, and an increase instruction for increasing the brake fluid pressure is formed after said decrease instruction disappears by a second skid condition as the judging results of said front and rear wheels for increasing the brake fluid pressures, said second skid condition being from the one of said rear and front wheels which generates said first skid condition earlier than the other of said front and rear wheels or being from the one of said rear and front wheels from which the first skid condition disappears after the first skid condition of the other of said rear and front wheels.

2. An apparatus according to claim 1, in which the brake fluid pressure increases in a stepwise manner in said second skid condition.

3. An apparatus according to claim 1, in which proportioning valves are arranged between said valve apparatus and said wheel cylinders of the rear wheels.

4. An anti-skid control apparatus according to claim 1, in which said valve apparatus comprises a casing, a piston slidably fitted to said casing, input and output chambers formed at both sides of said piston, input ports communicating with said input chambers, respectively, output ports communicating with said output chambers, respectively, and valve members arranged between said input and output chambers, and operated by said piston, wherein one of said input ports is connected to the wheel cylinder of the right front wheel, one of said output ports which communicates with the one of said output chambers being at the same side as the input chamber communicating said one of the input ports is connected to the wheel cylinder of the left rear wheel, the other of said input ports is connected to the wheel cylinder of left front wheel, the other of said output ports which communicates with the other of said output chambers being at the same side as the input chamber communicating said other of the input ports is connected to the wheel cylinder of the right rear wheel.

5. An anti-skid control apparatus according to claim 4, in which a fail detecting switch is engaged with said piston.

6. An anti-skid control apparatus for a vehicle braking system including:
   (A) a pair of front wheels and a pair of rear wheels each of said wheels having a wheel cylinder associated therewith where said wheel cylinders are diagonally connected by conduits;
   (B) a tandem master cylinder having first and second fluid pressure generating chambers;
   (C) a first fluid pressure control valve device for controlling the brake fluid pressure of the wheel cylinder of one of said front wheels arranged between said first fluid pressure generating chamber of the tandem master cylinder and the wheel cylinder of the one front wheel;
   (D) a second fluid pressure control valve device for controlling the brake fluid pressure of the wheel cylinder of the other of said front wheels arranged between said second fluid pressure generating chamber of said tandem master cylinder and the wheel cylinder of said other front wheel;
   (E) a control unit for measuring or judging the skid conditions of said front and rear wheels and for generating instructions for controlling said first and second fluid pressure control valve devices; and
   (F) a valve means for generating a fluid pressure in accordance with the lower one of the brake fluid pressures of said front wheels controlled by said first and second fluid pressure control valve devices, said valve means being arranged between said wheel cylinders of the front wheels and the wheel cylinders of the rear wheels; said control unit combining logically the measuring or judging result of the skid condition of the one front wheel with that of the rear wheel being at the same side of the road as said one front wheel for generating the instruction for controlling said first fluid pressure control valve device, and combining logically the measuring or judging result of the skid condition of the other front wheel with that of the rear wheel being at the same side of the road as said other front wheel for generating the instruction for controlling said second fluid pressure control valve device; wherein a decrease instruction for decreasing the brake fluid pressure is formed by the logical sum of a first skid condition as the judging results of said front and rear wheels for decreasing the brake fluid pressures, and an increase instruction for increasing the brake fluid pressure is formed after said decrease instruction disappears by a second skid condition as the judging results of said front and rear wheels for increasing the brake fluid pressures, said second skid condition being from the one of said front and rear wheels which has a lower acceleration than the acceleration of the other of said rear and front wheels after the decrease instruction.

7. An apparatus according to claim 6, in which the brake fluid pressure is increased in a step-wise manner in said second skid condition.

8. An apparatus according to claim 6, in which proportioning valves are arranged between said valve apparatus and said wheel cylinders of the rear wheels.

9. An anti-skid control apparatus according to claim 6, in which said valve apparatus comprises a casing, a piston slidably fitted to said casing, input and output chambers formed at both sides of said piston, input ports communicating with said input chambers, respectively, output ports communicating with said output chambers, respectively, and valve members arranged between said input and output chambers, and operated by said piston, wherein one of said input ports is connected to the wheel cylinder of the right front wheel, one of said output ports which communicates with the one of said output chambers being at the same side as the input chamber communicating said one of the input ports is connected to the wheel cylinder of the left rear wheel, the other of said input ports is connected to the wheel cylinder of the left rear wheel, the other of said input ports is connected to the wheel cylinder of left front wheel, the other of said output ports which communicates with the other of said output chambers being at the same side as the input chamber communicating said other of the input ports is connected to the wheel cylinder of the right rear wheel.

10. An anti-skid control apparatus according to claim 9, in which a fail detecting switch is engaged with said piston.

11. An anti-skid control apparatus for a vehicle braking system including:
(A) a pair of front wheels and a pair of rear wheels each of said wheels having a wheel cylinder associated therewith where said wheel cylinders are diagonally connected by conduits;
(B) a tandem master cylinder having first and second fluid pressure generating chambers;
(C) a first fluid pressure control valve device for controlling the brake fluid pressure of the wheel cylinder of one of said front wheels arranged between said first fluid pressure generating chamber of the tandem master cylinder and the wheel cylinder of the one front wheel;
(D) a second fluid pressure control valve device for controlling the brake fluid pressure of the wheel cylinder of the other of said front wheels arranged between said second fluid pressure generating chamber of said tandem master cylinder and the wheel cylinder of said other front wheel;
(E) a control unit for measuring or judging the skid conditions of said front and rear wheels and for generating instructions for controlling said first and second fluid pressure control valve devices;
(F) a valve means for generating a fluid pressure in accordance with the lower one of the brake fluid pressures of said front wheels controlled by said first and second fluid pressure control valve devices, said valve means being arranged between said wheel cylinders of the front wheels and the wheel cylinders of the rear wheels; said control unit combining logically the measuring or judging result of the skid condition of the one front wheel with that of the rear wheel being at the same side of the road as said one front wheel for generating the instruction for controlling said first fluid pressure control valve device, and combining logically the measuring or judging result of the skid condition of the other front wheel with that of the rear wheel being at the same side of the road as said other front wheel for generating the instruction for controlling said second fluid pressure control valve device; wherein a decrease instruction for decreasing the brake fluid pressure is formed by the logical sum of a first skid condition as the judging results of said front and rear wheels for decreasing the brake fluid pressures, a brake holding instruction for maintaining the brake fluid pressure constant is formed before said decrease instruction appears by the logical sum of a second skid condition as the judging results of said front and rear wheels for maintaining the brake pressure constant, and an increase instruction for increasing the brake fluid pressure is formed after said decrease instruction disappears by a third skid condition as the judging results of said front and rear wheels for increasing the brake fluid pressures, said third skid condition being from the one of said rear and front wheels which generates said second skid condition earlier than the other of said rear and front wheels.

12. An apparatus according to claim 11, in which said increase instruction is formed by said third skid condition, said third skid condition being from the one of said rear and front wheels which generates both said first skid condition and said second skid conition earlier than the other of said rear and front wheels.

13. An apparatus according to claim 11 or 12, in which the brake fluid pressure is increased in a stepwise manner in said second skid condition.

14. An apparatus according to claim 11 or 12, in which proportioning valves are arranged between said valve apparatus and said wheel cylinders of the rear wheels.

15. An anti-skid control apparatus according to claim 11 or 12, in which said valve apparatus comprises a casing, a piston slidably fitted to said casing, input and output chambers formed at both sides of said piston, input ports communicating with said input chambers, respectively, output parts communicating with said output chambers, respectively, and valve members arranged between said input and output chambers, and operated by said piston, wherein one of said input ports is connected to the wheel cylinder of the right front wheel, one of said output ports which communicates with the one of said output chambers being at the sam side as the input chamber communicating said one of he input ports is connected to the wheel cylinder of the left rear wheel, the other of said input ports is connected to wheel cylinder of left front wheel, the other of said output ports which communicates with the other of said output chambers being a the same side as the input chamber communicating said on the of the input ports is connected to the wheel cylinder of the right rear wheel.

16. An anti-skid control apparatus according to claim 11 or 12, in which a fail detecting switch is engaged with said piston.

* * * * *